(12) United States Patent
Low

(10) Patent No.: US 7,264,472 B2
(45) Date of Patent: Sep. 4, 2007

(54) ANALOG DEMONSTRATOR SHOWING QUALITATIVE WEIGHT LOSS OR GAIN RESULTING FROM DIET AND EXERCISE

(76) Inventor: David Nicholson Low, 1425 Athens Rd., Wilmington, DE (US) 19803

( * ) Notice: Subject to any disclaimer, the term of this patent is extended or adjusted under 35 U.S.C. 154(b) by 533 days.

(21) Appl. No.: 10/640,621

(22) Filed: Aug. 14, 2003

(65) Prior Publication Data

US 2005/0037328 A1    Feb. 17, 2005

(51) Int. Cl.
*G09B 19/00* (2006.01)
(52) U.S. Cl. .................... 434/127; 434/365
(58) Field of Classification Search ............. 434/127
See application file for complete search history.

(56) References Cited

U.S. PATENT DOCUMENTS

| 4,212,079 | A | * | 7/1980 | Segar et al. ............ 600/300 |
| 5,673,691 | A | * | 10/1997 | Abrams et al. ......... 600/300 |
| 5,839,901 | A | * | 11/1998 | Karkanen ............... 434/127 |
| 6,513,532 | B2 | * | 2/2003 | Mault et al. ............ 600/595 |

\* cited by examiner

*Primary Examiner*—Robert E. Pezzuto
*Assistant Examiner*—Cameron Saadat

(57) ABSTRACT

This invention is an analog device that can be used before an audience to qualitatively demonstrate the interaction of diet, exercise and weight in the human body. The device folds for easy transport.

5 Claims, 4 Drawing Sheets

US 7,264,472 B2

ANALOG DEMONSTRATOR SHOWING QUALITATIVE WEIGHT LOSS OR GAIN RESULTING FROM DIET AND EXERCISE

RELATED APPLICATIONS

FEDERAL HELP

No federally sponsored research or development is related to this application.

BACKGROUND OF THE INVENTION

The U.S. Surgeon General has stated that excess weight is a national problem with approximately thirty-percent of U.S. citizens over weight. He has also stated that excess weight is likely to soon replace cigarette smoking as the leading cause of preventable premature death. Additional information released by the American Obesity Association also indicates the problem will become even more intense in the future. In 1978, 5% of children ages 12 to 19 were obese. In 2000 15.5% of children 12 to 19 were obese.

As a result of the above situation, there are many commercial and non-profit groups with efforts directed toward weight loss. These groups often meet for demonstrations and discussions on dieting and exercise with an eye toward losing weight. Some participants have difficulty separating the emotional and psychological aspects of weight control from the physical aspects of weight control.

SUMMARY OF THE INVENTION

This invention is a qualitative analog device which graphically demonstrates physical relationship between diet, exercise and weight without emotional and psychological components of weight control. Its size makes it suitable for use by a speaker before a modest audience. The analog folds to reduce its size, which makes it easily portable in a carrying case.

The analog shows how the body is like any other self-limiting system powered by an energy source, and how all such systems follow the first law of thermodynamics, which states that energy can not be created or destroyed.

The analog responds to diet and exercise like the human body, and it shows that every combination of diet and exercise results in a certain equilibrium weight. For the analog, "diet" is defined as calories eaten or energy "in". "Exercise" is defined as all forms of energy use by the body or as energy "out". These include energy for operating the heart and lungs, maintaining body temperature and any physical movement of the body. If diet is increased with no seeming change in exercise, weight will increase. A frequent surprise to a viewer is that exercise as defined above does increase without the person knowing it.

As weight increases every physical activity takes more energy. A heavy person's heart must work harder, muscles that work his lungs work harder; every physical activity takes more energy. For example if a person weighing 125 pounds gains to 250 pounds, twice as much energy is needed to climb a flight of stairs at 250 pounds as needed at 125 pounds. Everything about the body at 250 pounds works harder and uses more energy than at 125 pounds.

If diet is held constant body weight adjusts itself so that energy "out", defined above as exercise, always matches energy "in" at equilibrium. The analog shows these same changes to weight in response to simulated changes to diet and/or exercise.

DRAWINGS

DETAILED DESCRIPTION OF THE INVENTION

The analog device is powered by flow of some form of energy such as an electrical current or a pressurized fluid through a suitable conductor such as a wire or a tube, for example. Energy flows in series first through a variable restrictor that can be changed to simulate changes in energy rate as "diet". For example, a variable electrical resistor or a valve for fluids can be used for this function. The selected energy form then flows through an energy rate meter which displays as "diet". An ammeter or fluid flow meter, for example, can be used for this measurement. A second matching energy rate meter displays as "exercise". A second matching variable restrictor can be changed to simulate changes in energy rate as "exercise". An energy magnitude meter measuring between the "diet" flow meter and the "exercise" flow meter displays as "weight". A voltmeter or a pressure gage, for example, can be used to measure energy magnitude.

In use it will be seen that equal changes to diet and to exercise cause no change in weight. All other changes to diet and or exercise will cause a change in weight. It will also be noted that weight will always reach a value as needed to make exercise-energy flow out equal to diet-energy flow in.

Figure 4:
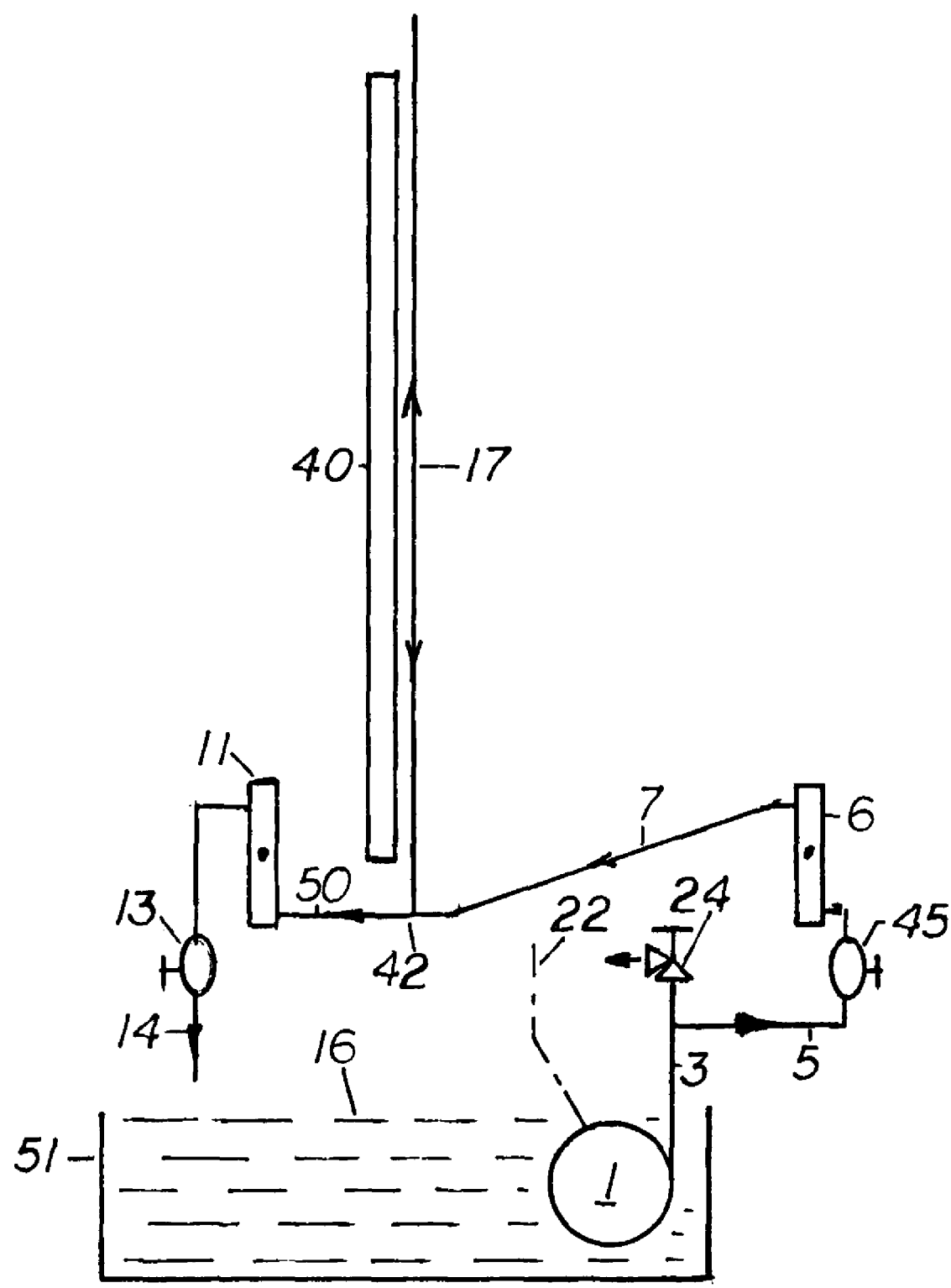
FIG. 4 is a simplified schematic drawing that shows functional operating parts from both FIG. 1 and FIG. 2.

FIG. 4 shows a simplified schematic of a hydraulic form of the analog device. In this case a pressurized flowing liquid 16 is used to simulate energy supplied to power the analog. An electrically-driven fish-tank type pump 1 is submerged in liquid 16 inside a pump tank 51. Pump tank 51 serves as a reservoir for liquid 16, and it also allows re cycling liquid 16. Pressure delivered by pump 1 is not critical, but the range of 25 to 40 inches of water is most suitable for moderately large audiences. Colored water for visibility and antifreeze as needed make a suitable liquid 16. Pump 1 is powered by an electrical source 22. Liquid 16 leaves tank 51 at a pump discharge 3. During pump start-up entrapped air at discharge 3 may hinder pump operation. A combined screw-type vent-and-elbow 24 can used to vent entrapped air from pump discharge 3 if necessary.

A "diet" valve 45 is used to throttle liquid 16 in a tube 5. Tube 5 and all other flow lines are most suitably made from clear, flexible plastic tubing that allows a clear vision of flowing liquid 16. Liquid 16 passes through a "diet" flow meter 6 where the flow of liquid 16 represents calories or energy taken in by a person or by any self limiting system that uses fuel to accomplish some form of work. Liquid 16 leaves "diet" meter 6 through a tube 7, passes a tubing "T" 42 and continues through a tube 50 to an "exercise" flow meter 11. A vertical tube 17 branches from tubing "T" 42 to form a manometer. Tube 17 is high enough to contain pressure developed by pump 1. An arbitrary scale 40 shows simulated weight resulting from simulated diet and simu lated exercise. Flow of liquid 16 through "exercise" meter 11 represents all uses of energy by a self-limiting system under consideration. In the case of a human body, these uses include energy for heart muscles, energy for breathing, energy to maintain body temperature and any additional energy used by the body for movement.

Liquid 16 leaving "exercise" meter 11 passes through an "exercise" valve 13 before entering a return tube 14 which discharges liquid 16 into tank 51. Exercise valve 13 matches diet valve 45 in size, and preferably both valves are the "needle" type for making small flow adjustments to liquid 16. These flow adjustments represent changes in diet (energy in) and to exercise (energy out).

Figure 1:
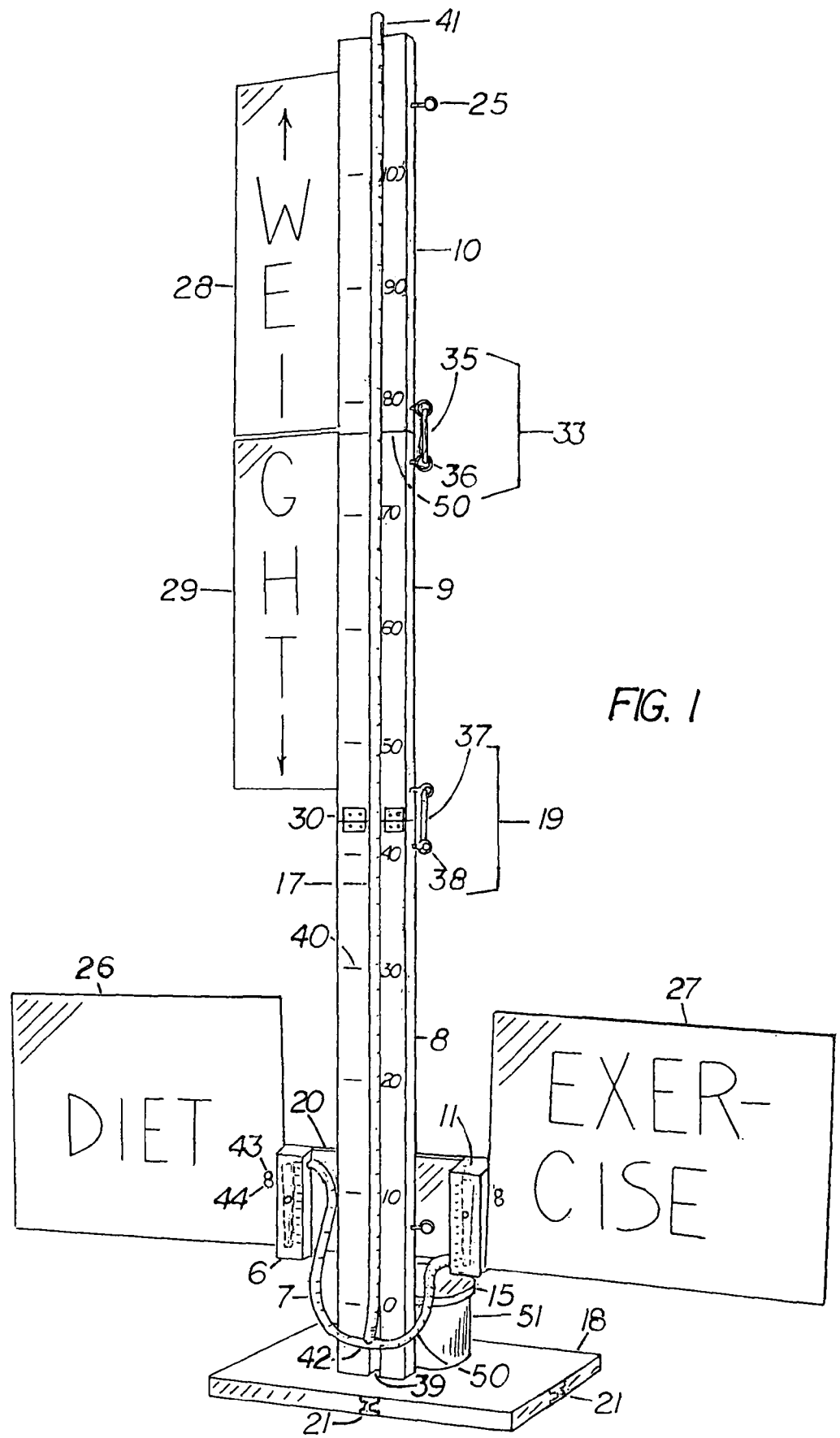
FIG. 1 shows the front of the diet, weight and exercise hydraulic analog with labeling signs in place, as it would be presented to an audience.
Figure 2:
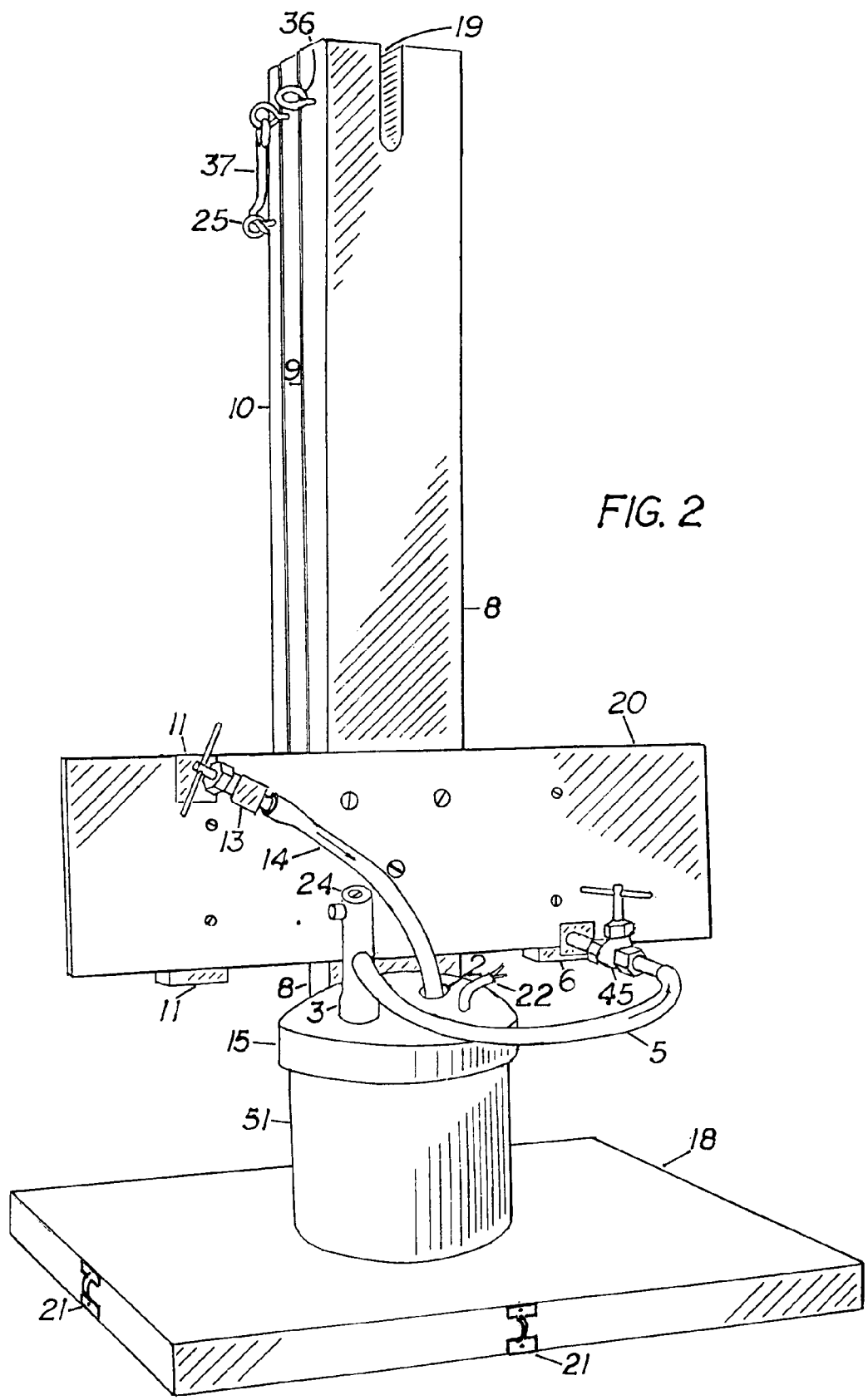
FIG. 2 shows the rear of the hydraulic analog folded and with labeling signs removed for transporting.

FIGS. 1 and 2 show physical construction used to implement the analog's schematic flow diagram in FIG. 4. The nature of its construction is based upon an assumption that the analog will be demonstrated before an audience, and that it can be easily transported to a new location.

FIG. 1 shows the analog, as it would be presented to an audience. A base 18 carries a vertical support for tube 17. This vertical support is cut twice to form a three-part hinged support for tube 17 so that it can be folded to reduce the analog's size for transporting. Base 18 also has an "eye" 21 on each of its four edges as part of a latch system for attaching a carrying case 47 in FIG. 3 to base 18. The vertical support In FIG. 1 consists of a lower support 8, a middle support 9 and an upper support 10. All three supports have a central lengthwise groove 39, which has depth and width equal to tube 17's diameter. This allows transparent plastic tube 17 to be completely recessed in groove 39. Supports 8 and 9 have a hinged joint 30, which allows support 9 to fold forward onto support 8. A similar hinged joint 50 allows support 10 to fold back onto support 9. Groove 39 is cut totally through supports 8 and 9 above and below hinged joint 30 and above and below hinged joint 50 to avoid crimping tube 17 when supports 9 and 10 are folded. The extent of these cut-through grooves is shown in FIG. 1 as 33 at hinged joint 50 and as 19 at hinged joint 30. Cut-through 19 on support 8 is also shown on FIG. 2. Although construction material is not critical to the invention, nominal ¾-inch thick wood is suitable for base 18 and for supports 8, 9 and 10.

In FIG. 1 a hook 37 on support 9 and an eye 38 on support 8 are provided to hold support 9 in an up-right position. Similarly, a hook 35 on support 10 and an eye 36 on support 9 are used to hold support 10 in an up-right position. In FIG. 2 hook 37 attached to support 9 and an eye 25 attached to support 10 are used for transporting the analog in its folded position. In a similar manner, hook 37 on support 9 and an eye 24 on support 8 are also used in the folded position.

In FIG. 1 lower support 8 carries a cross member 20 which supports "diet" flow meter 6 and "exercise" flow meter 11. Any type of flow meters can be used; however, matched transparent-plastic meters using a tapered tube with float and a visible scale are preferred.

Cross member 20 also supports a DIET sign 26 and an EXERCISE sign 27. Also, a WEI sign 28 is attached to support 10 and a GHT sign 29 is attached to support 9. These signs are only attached during a demonstration and their easy attachment and removal as described below for sign 26 is typical for all four signs.

For DIET sign 26, a screw 43 is screwed partway into cross member 20. Free space between the head of screw 43 and member 20 is slightly more than the thickness of sign 26. A hole-and-vertical-slot 44 in sign 26 allows the sign's removal by lifting sign 26 to align screw 43 with hole 44. Hole 44 is slightly larger in diameter than the head of screw 43, and slot 44 is slightly wider than the shaft of screw 43. EXERCISE sign 27 is attached to cross member 20 in a similar manner.

WEI sign 28 and GHT sign 29 have 90-degree backward bends equal to support material thickness where the signs touch their supports 9 and 10. Screws like screw 43 are attached at each end of support 9 and of support 10. Matching holes-and-slots similar to hole-and-slot 44 at each end of the bend for sign 28 and for sign 29 allow their easy installation and removal.

All signs are made of a thin light material, preferably approximately 0.020 inch thick aluminum. Dimensions of the signs are limited so that the signs fit into a carrying case 47 in FIG. 3 in front of the folded analog shown in FIG. 2.

Tank 51 in FIG. 2 is made of transparent material so that the level of liquid 16 can be monitored. Pump 1 is attached to the underside of a screw-fitting top 15 for tank 51. Openings in top 15 allow pump outlet 3 and electrical power line 22 to protrude from top 15. Spaces around outlet 3 and line 22 are sealed. A hole 2 in top 15 is larger in diameter than return tube 14, and space around tube 14 serves as an atmospheric vent for tank 51 when the analog is being demonstrated.

Tank 51 can be removed for draining or for filling. Top 15 is held while tank 51 is unscrewed. The length of tube 5 allows top 15 with pump 1 to be lifted and tank 51 removed.

Preparing the Analog for Transporting

Figure 3:
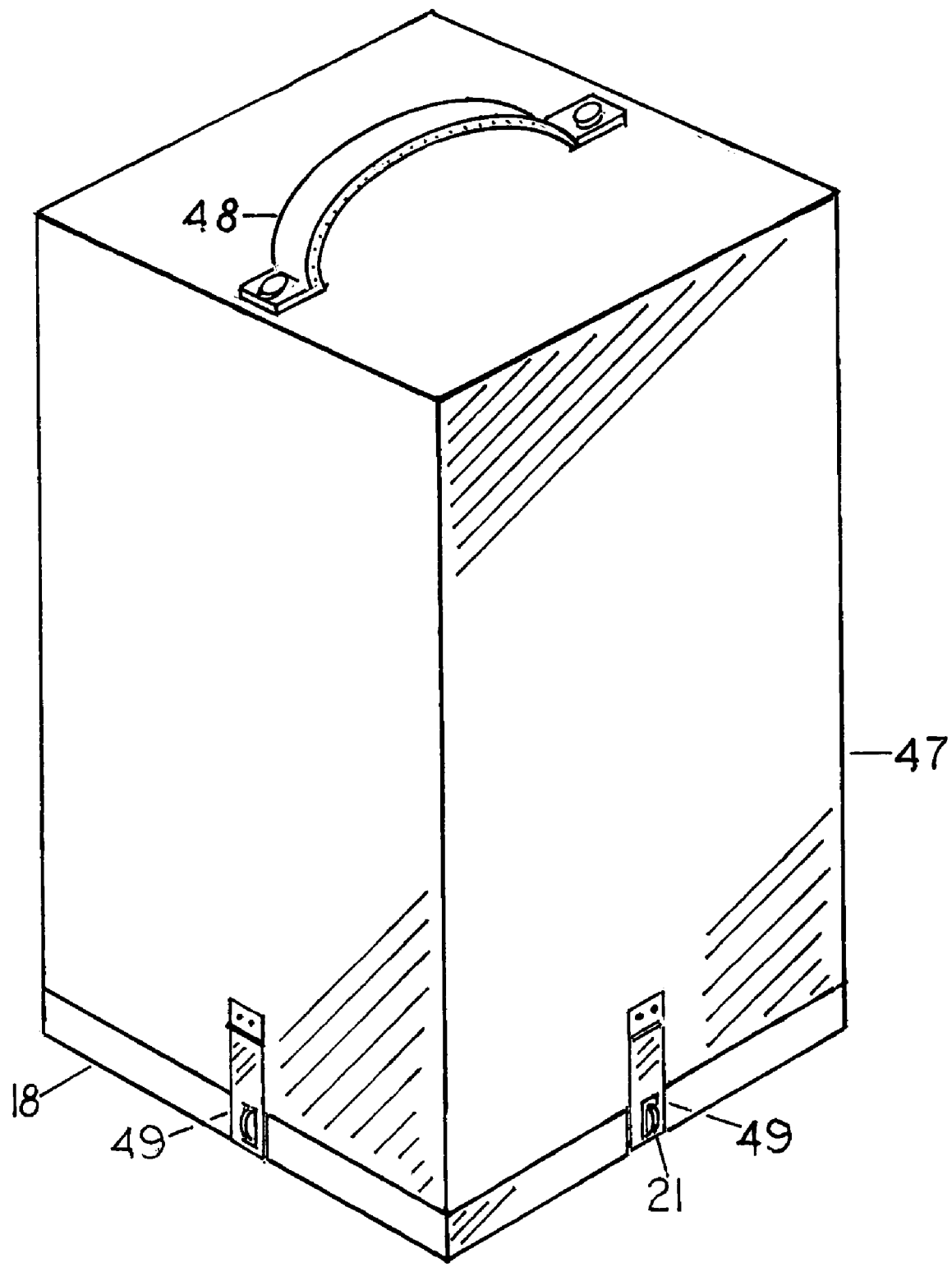
FIG. 3 shows the folded analog in its carrying case for transporting.

Several steps are necessary in preparing the analog for transport:

All signs are removed.
Power cord 22 is disconnected from its power source.
As much liquid 16 as possible is drained back to tank 51 by opening valves 13 and 45.
Support 10 is folded back in FIG. 1 onto support 9, and hook 37 connected into eye 25.
Support 9 (with 10) is folded forward in FIG. 1 onto support 8, and hook 35 connected into eye 24.
Return tube 14 in FIG. 2 is removed from hole 2.
Hole 2 is sealed with a stopper.
Valves 13 and 45 are closed.
A hose clamp is used to seal tube 17 at an extension 41 if necessary.
All signs are placed in front of support 8.
Carrying case 47 in FIG. 3 is placed over the folded analog shown in FIG. 2, and four hasps 49 in FIG. 3 latch case 47 to eyes 21 on base 18.
A handle 48 in FIG. 3 is used to carry the analog.

The analog of this invention uses hydraulic principles to show the effect of energy used by a self-regulating system to perform some form of work. The human body (and all animals) are this type of system with regard to diet, exercise and weight.

An electrical, digital or pneumatic device could show the same relationship between diet, exercise and weight. However, it is believed that the hydraulic system has an inherent advantage because of its simplicity and transparency. Any of the other devices require some form of "black box" which many people view as mysterious and capable of doing anything for which it is programmed. An audience is more likely to trust the hydraulic system where every thing is visible, and its most complicated part is a familiar fish-tank pump.

The invention claimed is:

1. An analog device which graphically simulates qualitative relationships between human diet, exercise and body weight, said device comprising a pressurized fluid passing through a suitable conduit as a means to simulate an energy flow and also to power said device, said energy flow being conducted in series through a variable diet-energy restrictor as a means to simulate changes in food intake, said food intake designated as diet energy, a diet-energy rate meter as a means to display said changes in diet energy, said simulated energy flow being further conducted in series through a second fluid rate meter designated as displaying exercise-energy rate, said exercise-energy comprising all energy used by the body for physical movement, respiration and body heat, a variable exercise-energy restrictor as a means to simulate changes in said exercise-energy, an energy magnitude meter connected to qualitatively simulate energy magnitude between said diet-energy rate meter and said exercise-energy rate meter as a means to display said simulated human body weight resulting from changes to said diet-energy rate and/or said exercise-energy rate.

2. The analog device of claim 1, wherein said energy flow is a pressurized liquid flowing through tubes as a means to power said analog device, said variable diet-energy restrictor being a throttle valve as a means to simulate changes in said diet-energy, said diet-energy rate meter being a liquid flow meter as a means to display said diet-energy flow rate, said exercise-energy rate meter being a liquid flow meter as a means to display exercise-energy rate, said exercise-energy restrictor being a throttle valve as a means to simulate changes in said exercise-energy, said energy magnitude meter being a pressure measuring device connected between said diet rate flow meter and said exercise-energy flow meter as a means to display said simulated body weight resulting from changes in said diet and said exercise.

3. The analog device of claim 2 wherein a fish-tank type electrically driven pump is a means for providing said flowing pressurized liquid to power said analog, said pump being liquid-submerged in a tank used as a means for recycling said liquid, said tank having a screw-closable top as a means to seal said tank, said pump being attached to said top with said pump's liquid outlet and electrical supply sealed through said top as a means to mount said pump, said pump's outlet being connected to a combined elbow and screw-type vent as a means to release air possibly trapped in said pump, said elbow being connected to a tube as a means to connect said pump to a diet throttle valve, all said tubes being flexible, clear plastic tubing, said tubing being a means to connect said elbow to said diet valve, said diet valve being a needle valve as a means to facilitate small liquid flow changes, said valve being tubing connected to a diet flow meter as a means to show diet-energy flow, said diet flow meter being a transparent tapered-tube-and-float type with scale, said diet flow meter being tubing-connected to a T before connecting to an exercise flow meter as a means to display said exercise-energy flow rate, said exercise flow meter matching said diet flow meter, said T branching to a vertical tube acting as a manometer as a means to measure pressure indicated as weight, said manometer being of a height to accommodate pressure generated by said pump, a vertical support mounted on a base as a means to support said manometer, said vertical support embodying a groove over its full length, said groove having a depth and a width equal to said vertical tube's diameter as a means to totally recess said tube in said vertical support, said base embodying an edge-mounted eye on each side as a means for latching a carrying case to said base, said exercise flow meter being connected to an exercise valve as a means to change exercise-energy flow, said exercise valve being connected to a return tube as a means to re-cycle said liquid, said return tube being inserted in a hole in said closable tank top as a means to return liquid to said tank, said hole in said top having larger diameter than said tube as a means to vent said tank when said analog is being demonstrated, said vertical support also carrying a cross member, said cross member acting as a means to support said flow meters and said valves, said cross member also carrying a removable sign DIET and a removable sign EXERCISE as means to identify said diet flow meter and said exercise flow meter to an audience, said vertical support carrying a removable sign WEI and a removable sign GHT as means to identify said manometer indication as weight to an audience.

4. The analog device of claim 3 wherein said vertical support is cut and hinged at two points so that said vertical support and said vertical tube can he folded as means to simplify transporting said device, said groove in said vertical support being cut through said support above and below each said hinge point as a means to allow folding said vertical tube without crimping said tube, said twice-cut vertical support embodying a hook-and-eye across each hinge as a means to hold said support in a vertical position during demonstrations, each said book being provided with a second eye positioned as a means to hold said support in a folded position while said device is being transported.

5. The analog device of claim 4 wherein a carrying case embodying latches and a handle is placed over said folded analog device, said latches being connected to their mating said eyes on said base, said carrying case providing a means for transporting said analog device.

* * * * *